UNITED STATES PATENT OFFICE.

WASHINGTON G. BENEDICT, OF ORANGE PARK, FLORIDA.

IMPROVEMENT IN PREPARING PALMETTO FIBER AND PINE-LEAVES FOR MATTRESS-FILLINGS, &c.

Specification forming part of Letters Patent No. 205,035, dated June 18, 1878; application filed May 23, 1878.

*To all whom it may concern:*

Be it known that I, WASHINGTON G. BENEDICT, of Orange Park, county of Clay, and State of Florida, have made a certain new and useful discovery in the combination of the palmetto fiber, as prepared by my Patent No. 201,269, (either curled and kinked or not,) and the leaves or straws of the pine tree, of which the following is a full, clear, and exact description:

The nature of my invention consists in the discovery that the palmetto fiber, combined with the leaves or straws of the pine tree, makes a bed that possesses great curative properties for such diseases as consumption and pulmonary affections.

The object is accomplished as follows: First, taking the leaves or buds or stalks, singly or combined, of the palmetto, and shredding or combing them, by machinery made for the purpose, into a fine fiber, which may be kinked and twisted, or used without; but I prefer the first method. The pine is gathered from selected thrifty-growing trees, as the stems or spindles are tougher than on old trees. One-half inch of each straw is cut off from the end that grows next to the tree, on account of the pitch adhering to it, and as it is of a soft, spongy nature. After the pine-straws are selected and prepared as described, they, with the prepared palmetto fiber, are put in layers, in about the proportion of six-tenths of palmetto fiber to four-tenths of prepared pine-straws. Both are then spun, by any suitable machinery, into a rope or coil, after which the rope is put into a steam-heated room, with a temperature of about 120° Fahrenheit, to dry. It must not be dried at a much greater heat than this, for fear of destroying the life and medicinal virtues of the pine. After the material is thoroughly cured in this coil or rope, when picked apart for use it is found to be curly, and of a very elastic nature, and it will retain its elasticity after use.

The strengthening aroma of the pine, combined with the dryness of the palmetto fiber, after preparing both by my method, is of great benefit to invalids suffering with pulmonary complaints, and the material will not become damp or moist in the wettest weather. Especially are these mattresses beneficial in hospitals, the warmth of the body causing the aroma of the pine to be extracted and diffused while the bed is in use, thus tending to strengthen and invigorate the weak patient.

Combining the palmetto fiber—either with or without the kink and curl—with the straw of the pine tree, as described, besides its curative qualities, gives the patient a soft and agreeable bed, free from dust and dirt. It may also be used for upholstering purposes, for making pillows, &c.

Having thus described my invention, what I claim as new, and desire to secure by Letters Patent, is—

1. A material for filling beds, mattresses, &c., consisting of shredded palmetto-leaves and pine-straws, combined in about the proportions specified.

2. A material for filling beds, upholstering, &c., consisting of curled and twisted palmetto fiber and pine-leaves, combined in about the proportions specified.

3. The method herein described of preparing an aromatic upholstering material, which consists in trimming and drying the leaves or straws of pine trees, &c., mixing these leaves or straws with shredded palmetto-leaves, either with or without the kink and curl, substantially as described.

4. The method herein described of preparing an aromatic upholstering material, which consists in trimming and drying the leaves or straws of pine trees, mixing these leaves with palmetto fiber, twisting both together into a rope, and picking apart to give a curled aromatic fiber, as described.

WASHINGTON G. BENEDICT.

Witnesses:
R. W. OWENS,
J. EDWARD ALLEN.